(12) United States Patent
Ueda et al.

(10) Patent No.: US 6,484,243 B1
(45) Date of Patent: Nov. 19, 2002

(54) SHARED MEMORY TRACING APPARATUS

(75) Inventors: Yasushi Ueda, Ehime (JP); Takahiro Watanabe, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/554,220

(22) PCT Filed: Sep. 17, 1999

(86) PCT No.: PCT/JP99/05067
§ 371 (c)(1),
(2), (4) Date: Aug. 31, 2000

(87) PCT Pub. No.: WO00/17756
PCT Pub. Date: Mar. 30, 2000

(30) Foreign Application Priority Data

Sep. 18, 1998 (JP) .......................................... 10-283268

(51) Int. Cl.⁷ ............................................... G06F 11/34
(52) U.S. Cl. ..................... 711/150; 711/151; 711/152; 710/243; 714/45
(58) Field of Search ............................ 714/45; 711/151, 711/152, 150; 710/114, 115, 243

(56) References Cited

U.S. PATENT DOCUMENTS 4,674,089 A * 6/1987 Poret et al. ................... 714/28
5,758,106 A * 5/1998 Fenwick et al. ............. 710/112
5,781,927 A * 7/1998 Wu et al. .................... 711/158

FOREIGN PATENT DOCUMENTS

| JP | 63-25742 | 2/1988 | |
| JP | 2-82344 | 3/1990 | |
| JP | 6-187256 | 7/1994 | |
| JP | 07013943 A | * 1/1995 | ........... G06F/15/16 |
| JP | 8063374 | 3/1996 | |
| JP | 2000132430 | 4/2000 | |
| JP | 2000132431 | 4/2000 | |

OTHER PUBLICATIONS

Australian Patent Office Search Report dated Apr. 5, 2001.
Australian Patent Office Examination Report dated Apr. 5, 2001.

* cited by examiner

*Primary Examiner*—Do Hyun Yoo
*Assistant Examiner*—Paul Baker
(74) *Attorney, Agent, or Firm*—McDermott, Will & Emery

(57) ABSTRACT

A signal processing apparatus in which an LSI includes a memory and a plurality of blocks for making access to the memory is provided with a trace control block 170 for tracing in a specific region of the memory the history of access by a required memory access block based on a setting by a microcomputer 110 so as to allow easy analysis of the cause in the event a trouble. Also, a quasi mediation block 180 is provided in a mediation block 150, which accepts a memory use request signal from other memory access block while tracing of access history is being performed and sends back a memory use approval signal without actually making access to an internal memory 160. In the event of a trouble, an analysis of the cause can be easily made by reading a specific tracing region of the internal memory 160 out from outside.

4 Claims, 1 Drawing Sheet

SHARED MEMORY TRACING APPARATUS

FIELD OF THE INVENTION

The present invention relates to a signal processing apparatus in which a large scale integrated circuit (LSI) includes a memory.

BACKGROUND OF THE INVENTION

In prior art signal processing apparatuses, bus information, such as data that appear in a bus accompanying system operation in the event of a trouble of the system and address, is stored using an analyzing apparatus such as a logic analyzer, or a tracing mechanism is incorporated in the system such as described in Japanese Laid-Open Patent Application No. Hei 6-187256.

With recent advances in the semiconductor technologies, LSI's in which various functional blocks and memories have been integrated on a large scale on a single chip have been developed; however, it is impossible to connect an analyzer as no memory interface signal is produced as an output from an LSI chip in the prior art signal processing apparatus configuration, thus suffering a problem of being unable to obtain information necessary for analysis of the operation in the event of a trouble. Also, incorporation of a tracing mechanism inside an LSI will require a control circuit dedicated to trouble analysis and a dedicated trace memory, thus presenting a problem of an increase in the LSI area and cost.

SUMMARY OF THE INVENTION

To address the above problems, the signal processing apparatus of the present invention wherein an LSI includes a memory and a plurality of blocks for accessing the memory comprises a mediation block for mediating the right of using a memory by inputting each memory use request signal produced by a memory access block and makes access to the memory, and a trace control block for producing a memory request signal for storing in the memory access history of the memory based on the result of mediation, and has a quasi mediation function of mediating, during a period in which a memory request signal for writing access history is being approved in the mediation block on the assumption that a memory request signal from other memory access blocks for writing access history has not been approved, and sending back an approval signal. It does not require a control circuit dedicated to trouble analysis or a dedicated trace memory and is capable of preventing an increase in LSI area and cost. The present invention provides a signal processing apparatus in which trouble analysis in the event of a trouble can be easily performed.

First exemplary embodiment of the present invention is a signal processing apparatus in which an LSI has a memory and a plurality of memory access blocks for making access to the memory, which comprises a mediation block for mediating right of use of the memory by inputting each memory use request signal produced by a memory access block, and a trace control block for producing as an output a memory request signal for storing in the memory access history of the memory based on the result of mediation, and which has a quasi mediation function of mediating, during a period in which a memory request signal for writing access history in the mediation block is being approved, assuming that a memory request signal from other memory access block for writing access history has not been approved and sending back an approval signal. It has a function in which a trace control block traces memory access history in the memory based on the result of mediation by the mediation block.

DESCRIPTION OF THE PREFERRED EMBODIMENTS

Figure 1:
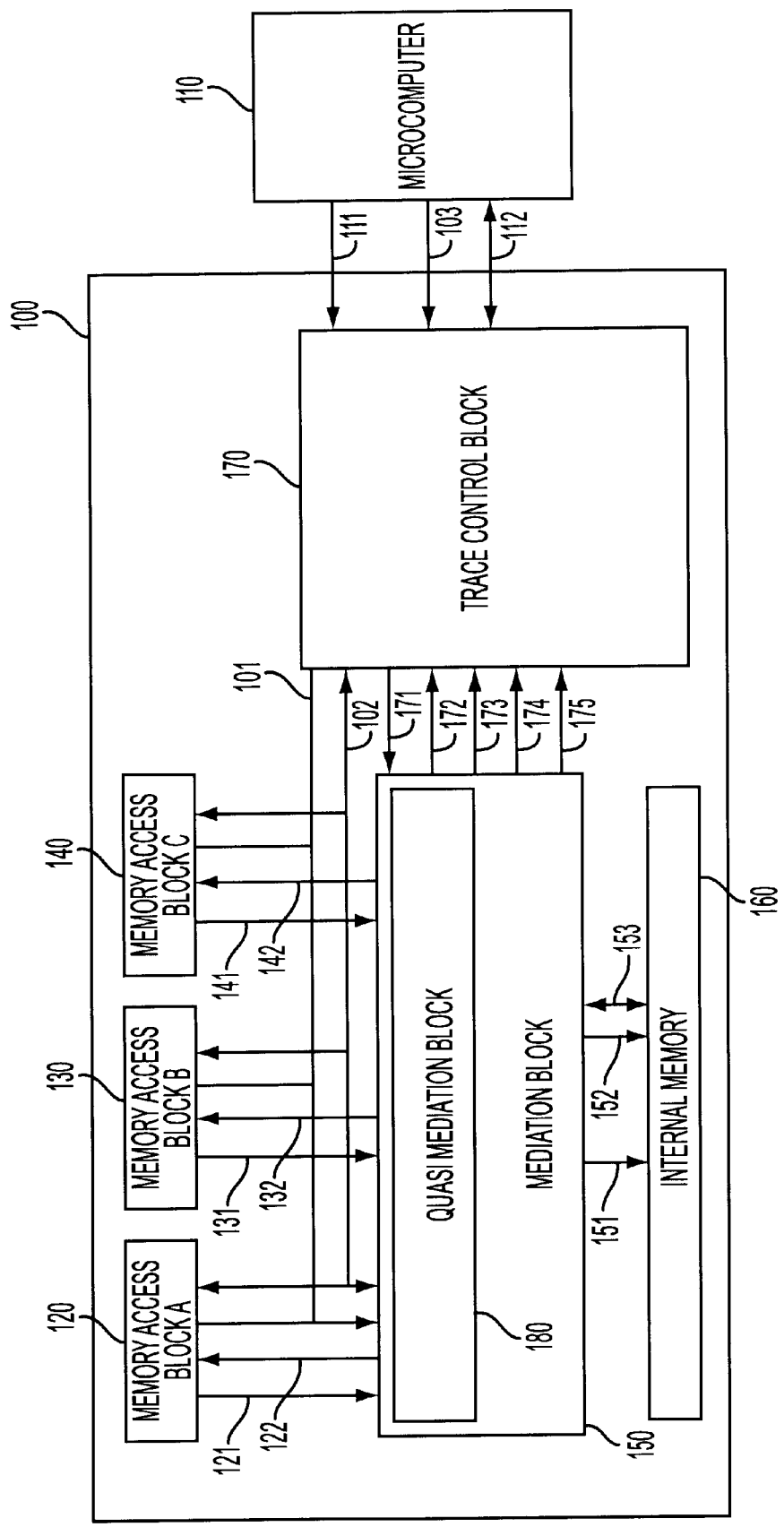
FIG. 1 is an electrical block diagram of an exemplary embodiment of the signal processing apparatus in accordance with the present invention.

Referring to FIG. 1, a description of an exemplary embodiment of the signal processing apparatus of the present invention will be given in the following.

In FIG. 1, a signal processing apparatus 100 is externally controlled by a microcomputer 110. The signal processing apparatus 100 has in it a memory access block A 120, a memory access block B 130, and a memory access block C 140 all for reading or writing an internal memory 160, a mediation block 150 (also referred to as an arbitration block) for mediating right of use of the memory based on a memory access request from each of the memory access block A 120, memory access block B 130, and memory access block C 140 and for making access to the internal memory 160, and a trace control block 170 for making control for storing memory access history in the internal memory 160 based on the results of mediation of the quasi mediation block 180 inside the mediation block 150 and the mediation block 150.

For the purpose of explaining operation of the present exemplary embodiment in a more concrete way, a separate description will be given in the following for each of the cases of (1) an access from other than the memory access block C 140 is accepted when storing access history of the memory access block C 140, (2) an access by the memory access block C 140 is accepted and tracing function is being executed, and (3) the quasi mediation block is in operation while an access by the memory access block C 140 is accepted and tracing function is being executed. Here, access history includes name of the access block, type of access, memory address, and memory data. Also, in each of the above cases, the order of priority of accepting a memory use request signal of each memory in the mediation block 150 is made to be: trace control block 170>memory access block A 120>memory access block B 130>memory access block C 140. In addition, it is assumed that an initial setting has been made so that access history of the memory access block C 140 can be stored in the trace control block 170 by using a microcomputer address bus 111, microcomputer bus 112, and a microcomputer control signal 103 from the microcomputer 110.

To begin with, a description will be given on the case in which an access from other than the memory access block C 140 is accepted when storing access history of the memory access block C 140. When the memory access block A 120 is sending out a memory use request signal (including property information) 121 and the memory access block B 130 is sending out a memory use request signal (including property information) 131 both to the mediation block 150, the mediation block 150 identifies the order of priority of accepting the memory use requests and sends back a memory use approval signal to the memory access block with a higher order of priority, indicating that a memory use request signal has been accepted. In this case, the mediation block 150 sends back a memory use approval signal 122 to the memory access block A 120 with a higher order of priority of accepting a memory use request signal and produces a result-of-mediation signal (including property information) 173, result-of-mediation address bus 174, and result-of-mediation data bus 175.

In the trace control block 170, confirmation is made as to whether the information based on the result of mediation agrees with the data which have been set to store access history; here, as the initial setting has been made to store access history of the memory access block C 140 in the trace control block 170, no agreement is found and tracing operation is not executed.

Also, the mediation block 150 executes the requested access of the memory access block A 120 on the internal memory 160 using a memory control signal 151, memory address bus 152, and memory data bus 153. After the memory access block A 120, the access request of which had been accepted, has withdrawn the memory use request signal 121, the mediation block 150 accepts a request of the memory access block B 130 with next high order of priority of acceptance and executes similar operation.

Next, the operation of executing tracing function upon acceptance of an access request by the memory access block C 140 will be described. When the memory access block C 140 is sending out a memory use request signal 141 to the mediation block 150, the mediation block 150 accepts the request of the memory access block C 140, sends back a memory use approval signal 142, and executes the requested access of the memory access block C 140 on the internal memory 160 using a memory control signal 151, memory address bus 152, and memory data bus 153. In this case, similarly to what has been described above, the mediation block 150 puts out to the trace control block 170 a result-of-mediation signal 173, result-of-mediation address bus 174, and result-of-mediation data bus 175, and executes the requested access of the memory access block C 140 on the internal memory 160 using a memory control signal 151, memory address bus 152 and memory data bus 153.

In the trace control block 170, confirmation is made as to whether the result-of-mediation signal 173, result-of-mediation address bus 174, and result-of-mediation data bus 175 agree with the data that have been set to store access history. Here, agreement is detected as the memory access block C 140 has been set, the trace control block 170 which has detected agreement generates access history data based on the result-of-mediation signal 173, result-of-mediation address bus 174, and result-of-mediation data bus 175, and sends out a memory use request signal for tracing 171, data bus for mediation 102, and address bus for mediation 101, to allow tracing of access history. After the memory access block C 140 of which the memory use request had been approved has withdrawn the memory use request signal (including property information) 141, a memory use request signal for tracing 171 is entered in the mediation block 150. In the mediation block 150, when a memory use request for tracing from the trace control block 170 is accepted, a memory use approval signal for tracing 172 is sent back to the trace control block 170, and requested access of the trace control block 170 is executed on the internal memory 160 using the memory control signal 151, memory address bus 152, and memory data bus 153.

Lastly, a description will be made on the case of operation of the quasi mediation block 180 during the period tracing function is being performed upon acceptance of the access of the memory access block C 140. When the memory access block C 140 is sending out a memory use request signal 141 to the mediation block 150, the mediation block 150 accepts the request of the memory access block C 140 and sends back a memory use approval signal 142. In this case, similarly to what has been described above, the mediation block 150 puts out to the trace control block 170 a result-of-mediation signal 173, result-of-mediation address bus 174, and result-of-mediation data bus 175 and executes a requested access on the internal memory 160 using a memory control signal 151, memory address bus 152 and memory data bus 153.

In the trace control block 170, confirmation is made as to whether the result-of-mediation signal 173, result-of-mediation address bus 174, and result-of-mediation data bus 175 agree with the data that have been set to store access history. Here, agreement is detected as the memory access block C 140 has been set, the trace control block 170 which has detected agreement generates access history data based on the result-of-mediation signal 173, result-of-mediation address bus 174, and result-of-mediation data bus 175, and sends out a memory use request signal for tracing 171, data bus for mediation 102, and address bus for mediation 101, to allow tracing of access history.

After the memory access block C 140 of which the memory use request had been approved has withdrawn the memory use request signal 141, a memory use request signal for tracing 171 and a new memory use request signal 121 are entered in the mediation block 150. In the mediation block 150, a request of the trace control block 170 with a higher order of priority of acceptance is accepted and a memory use approval signal for tracing 172 is sent back. At this time, in order to make the system operation during tracing of access history data the same as the system operation while access history data are not being traced, the quasi mediation block 180 accepts a memory use request signal 121 on behalf of the mediation block 150 and sends back a memory use approval signal 122 to the memory access block A 120. At this time, the mediation block 150 writes access history data in the internal memory 160 by using the memory control signal 151, memory address bus 152, and memory data bus 153, and does not take any requesting action for the memory access block A 120 on the internal memory 160.

By repeating the above described operation, tracing of access history data is subsequently performed each time an access by the memory access block C 140 is made. However, for a memory use request signal taking place during tracing operation, only a memory use approval signal by the quasi mediation block 180 is sent back and no action is taken on the internal memory 160.

As has been described above, with the signal processing apparatus of the present exemplary embodiment, information necessary for the analysis of operation in the event of a trouble can be obtained by the trace control block 170 by tracing the necessary access history data in the internal memory 160 to which the memory access blocks, namely, the memory access block A 120, memory access block B 130, and memory access block C 140 make access, and the reproduction of trouble occurrence is easily made, thus enabling smooth analysis of the cause.

In the above, tracing of access history data of one memory access block has been described, but simultaneous tracing of more than one memory access blocks is also possible.

INDUSTRIAL APPLICATION

As has been described above, with the signal processing apparatus of the present invention in which a memory is contained in an LSI, in the event of a trouble, an advantageous effect of easy reproduction of trouble occurrence and smooth analysis of the cause is provided by adding a small size control circuit such as a trace control block by being able to obtain information necessary for operational analysis under the same conditions as no tracing is being performed without incorporating in the system a trace memory dedicated to access history data, and without increasing the load of the memory bus.

What is claimed is:

1. A signal processing apparatus in which an LSI includes a memory and a plurality of memory access blocks for making access to the memory, the signal processing apparatus comprising:

an arbitration block for arbitrating right of memory use, said arbitration block operative for receiving each memory use request signal produced by said plurality of memory access blocks and for controlling access to the memory, and a trace control block for producing a memory request signal for storing the memory access history in the memory based on the result of the arbitration performed by said arbitration block, wherein said apparatus performs a quasi arbitration function of performing arbitration such that an approval signal is sent back to a memory access block making a memory access request during the operation of storing the memory access history in the memory.

2. The signal processing apparatus according to claim 1, wherein said trace control block allows for storage of the memory access history of a predetermined memory access block of said plural memory access blocks.

3. The signal processing apparatus according to claim 2, wherein said trace control block is operative for preventing the storage of the memory access history of memory access blocks other than said predetermined memory access block.

4. The signal processing apparatus according to claim 1, wherein a memory access request from a memory access block associated with the storage of the memory access history is afforded the highest priority relative to other memory access requests.

* * * * *